April 22, 1924.
W. A. RUSSELL
1,490,940
AIR VALVE
Filed Feb. 11, 1921
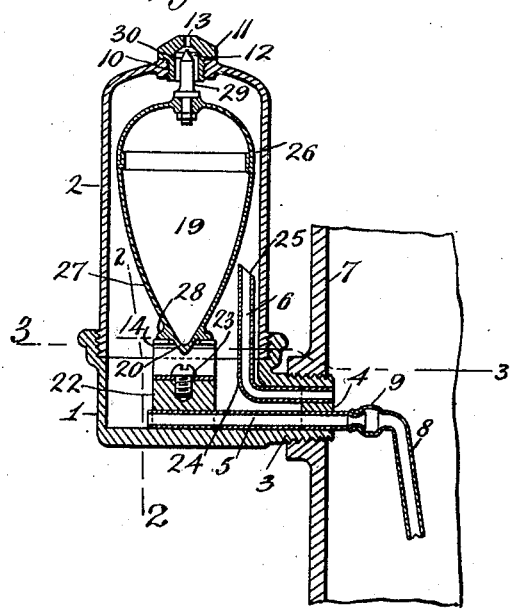
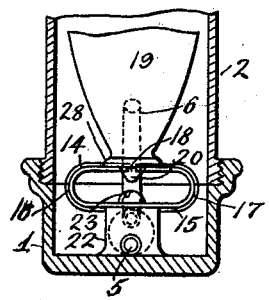
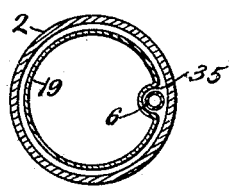
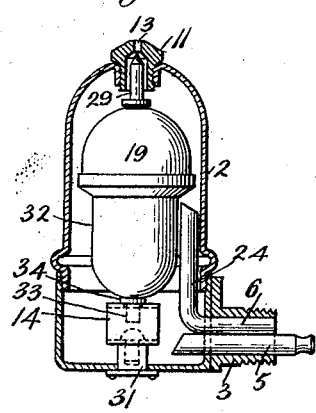
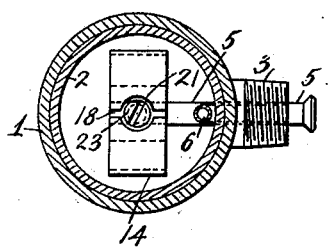
INVENTOR
William A. Russell
BY HIS ATTORNEYS Patented Apr. 22, 1924.

1,490,940

UNITED STATES PATENT OFFICE.

WILLIAM A. RUSSELL, OF YONKERS, NEW YORK.

AIR VALVE.

Application filed February 11, 1921. Serial No. 444,072.

*To all whom it may concern:*

Be it known that I, WILLIAM A. RUSSELL, a citizen of the United States, residing at Yonkers, county of Westchester, and State of New York, have invented certain new and useful Improvements in Air Valves, fully described and represented in the following specification and the accompanying drawings, forming a part of the same.

This invention relates to certain improvements in air valves for radiators.

Air valves are used with radiators to provide a communication between the radiator and the outer air, and it is the function of these valves to permit escape of air in the radiator to the atmosphere, the valve closing after the air has been expelled to avoid the discharge of steam through the valve. To effect this and prevent the escape of steam these valves must close as soon as the air has been expelled and the valves must therefore operate with great quickness.

These valves are delicate and, as heretofore constructed have generally included a casing in which works a float or its equivalent which is actuated to close the valve after the air has been expelled from the radiator. These floats have to respond quickly to thermal changes and work accurately in the casing to effect the proper opening and closing of the valve. To produce a simple and quick working valve it has been proposed to use a thermostatic element for effecting the opening and closing of the valves. In constructions, however, where such thermostatic element has been used the parts have been arranged so that the expansive movement of the thermostat is transmitted to the float unevenly so that the float is liable to tip and does not seat accurately in the casing, so as to properly open and close it. Furthermore, in the arrangement proposed the thermostatic metal has been placed in the valve so that it blocks or impedes the passage of water of condensation from the valve back to the radiator thus causing water logging of the valve.

It is the especial object of the present invention to produce an improved thermostatic air valve in which the parts are arranged so that an even opening and closing movement is given the float so as to prevent the float from tipping and thus binding in the valve casing and improperly seating to close or open the valve, and in which free passage of water from the valve to the radiator is provided so that the valve will not water log.

A further object of the invention is to provide a valve of simple construction and of few parts so that it may be made economically, and shall be durable and positive in its operation.

A further object of the invention is to provide an improved float for these valves which shall be of such shape as to provide a maximum float capacity within the limits of the float casing and at the same time permit an air passage to be provided above the passage by which water of condensation is returned to the radiator, so that air pressure may be introduced above such passage and force out the water of condensation and clear the valves.

With these and other objects not specifically referred to in view, the invention consists in certain novel parts and combinations which will be fully described in connection with the accompanying drawings which show a preferred embodiment of the invention, and the novel features will then be pointed out in the claims hereunto annexed.

In these drawings—

Figure 1 is a sectional elevation of one embodiment of the improved valve construction shown as connected to a radiator.

Figure 2 is a sectional view of part of the construction shown in Fig. 1, the section being taken on line 2—2 of that figure.

Figure 3 is a sectional plan view of the construction shown in Fig. 1, the section being taken on line 3—3 of that figure.

Figure 4 is a side elevation partly in section of a modified form of construction; and Figure 5 is a sectional view through the float showing a modified form of float which may be employed under some circumstances.

Referring now to these drawings, the improved air valve will include a casing formed of a base 1 into which is threaded or otherwise secured a cap 2. This cap and base form what will hereinafter be termed the casing of the valve, this construction being adapted for ready assembling of the parts and removal therefrom for repair or other purpose. The lower part or base 1 of the casing is provided with a threaded boss or projection 3, which is in the construction shown in Fig. 1, divided by a central partition 4 to provide an independent passage for a pipe 5 located at the bottom of the casing through which water of condensation may pass therefrom to the radiator, and a pipe 6 through which air and steam may be expelled from the radiator into the valve casing.

One wall of the radiator is shown in section marked 7, and the projection or boss 3 is screwed into this radiator wall. The water escape pipe 5 extends into the radiator and connects therein with a bent drip pipe 8 which acts in effect as a siphon, to siphon off the water of condensation from the valve. This drip pipe is secured to the pipe 5 by a connection which will permit the casing to be screwed into the radiator without turning the pipe so that the pipe will always extend downwardly into the radiator and perform its siphoning function.

While various constructions for effecting this may be provided, as shown the pipes 5 and 8 are connected by a swivel joint 9, and in assembling the parts the pipe 8 is first passed into the radiator and then the casing screwed therein.

The casing is provided at the top with an opening 10 into which is screwed a plug 11 having a recess 12 and a passage or vent 13 open to the air, this construction being adopted so that access to the interior of the casing through the opening 10 may be easily obtained.

The opening and closing of the vent 13 in the casing is controlled by a float valve and thermostatic element for operating the valve of novel construction and arrangement in the casing, and it is in this float valve and its operating thermostat that the present invention particularly resides.

Referring first to the construction shown in Fig. 1, there is provided a thermostatic element which is so formed and arranged as to exert an even lifting of the float, so that the float will properly seat, and there are provided connections between the float and this thermostatic element so that the float will be thus lifted and guided in its lifting movements. To effect this the thermostatic element will be formed so as to exert a lifting movement on each side of the float so that the float is lifted in a straight line and is prevented from tipping in the casing so that the float will always be accurately guided to effect the closing and opening of the escape part of the casing.

While various constructions of thermostat may be employed for effecting this, in the preferred construction and as illustrated, there is employed a strip of the usual thermostatic metal 14, which is formed with a base 15 and oppositely extending arms 16, 17, these arms being bent or curved into the form of an open loop with a space indicated at 18 between the adjacent edges of the arms. With this construction each of the arms expands upwardly on each side of the opening so that an equal pressure is exerted on opposite sides of the float and the float is evenly lifted. The float which is marked 19 may be of various configurations, but will be provided with a part which may extend into this space between the arms of the thermostatic strip so that the arms will lie on opposite sides of the float.

While this may be done in various ways, in the construction shown in Fig. 1, the float is provided with a reduced circular lower portion marked 20 which extends into the space between the strips. Where this construction is adopted, the ends of the arms will be recessed out, as indicated at 21 in Fig. 3, so as to form a seat for this reduced end of the float. The float thus seats in the arms and is lifted evenly thereby and guided in its raising and lowering movement. The end of the float will project between the arms of the thermostat a sufficient distance so that if lifted by water of condensation, it will not move out of operative relation with the arms.

The thermostatic strip may be secured in any suitable manner as to a projection 22 rising from the bottom of the base 1, before referred to, the strip being secured to this projection in any suitable manner, as by a screw 23.

In the best constructions the thermostatic strip will be arranged on the projection so as not to obstruct in any way the passage of water of condensation through the pipe 5. As illustrated the strip is arranged so as to lie at an angle, preferably at right angles to the entrance of the passage through which the water of condensation passes to the radiator, so that the strip lies edgewise to the direction of the flow of the water through the passage and thus does not impede or block the water passage to the radiator and thus cause water logging of the valve. Furthermore by mounting it on the projection it may be raised above the pipe 5 and thus be out of the way of water passing through the pipe or passage.

The air pipe 6, before referred to, is provided so that air or steam may be expelled from the radiator into the valve and escape therefrom to the vent 13, and this air pipe will preferably extend upwardly a considerable distance in the casing so as to be above the normal level of any water of condensation which may gather therein, so that if there is water of condensation in the valve and the valve is closed, a sufficient air pressure may be produced above the water level as to act with the siphon tube 8 to clear the valve so that the valve will function. The pipe is, therefore, provided with a bend 24 and the top of the pipe is preferably formed so as to slope toward the wall of the casing, as indicated at 25 so that any air or steam issuing therefrom is directed against the wall of the casing and not against the float.

With this construction a passage for air and steam is provided by means of the pipe and it is necessary to use only a single casing, as the cap 2, for enclosing the valve, thus producing a simple structure of very few parts.

In valves of this type, it is desirable to have the float of as large a size as possible within the limits of the casing so as to maintain the maximum floating capacity, and the float is, therefore, of such size as to fill the casing, sufficient clearance being left between the float and the sides of the casing to permit the free action of the float. In the best constructions, therefore, means will be provided for employing a float of large capacity and at the same time leaving room enough for the air pipe to extend between the float and the casing without interfering with the movement of the float.

While this may be effected in various ways, a novel form of float has been provided in which the float is formed so as to have a reduced lower portion, this reducing of the diameter of the float providing a space for the air pipe. In the construction shown in Fig. 1, this is effected by making the float somewhat egg-shape with the major diameter indicated at 26 above and the reduced portion indicated at 27 below, the float at its major diameter filling up the casing with only sufficient clearance to permit free action of the float and passage of air and steam past it to the vent.

Where such constructions are employed the lower end of the float is formed with the circular reduced portion 20, before referred to, to which enters the space between the arms of the thermostatic strip. Where the float is egg shape preferably it will be formed with a flange or ridge 28 which forms a bearing surface for the arms of the thermostatic strip to bear against and thus facilitate the action of the thermostatic strip in lifting the float. The float at its upper end will carry a valve 29 which is guided in the recess 12, before referred to, and which has a pointed end 30 which closes the vent 13 in the casing.

In Fig. 4 is shown a somewhat modified form of construction for effecting the purpose of the invention. In the construction illustrated in this figure, the thermostatic strip 14 is secured to a plug 31 extending through the bottom of the base 1, and the boss 3 is formed without any partition but capacitated to take the two pipes 5, 6, superposed and the pipe 5 may be somewhat shorter than in the construction illustrated in Fig. 1. In this modification the float is provided with a reduced portion 32 on the end of which is a nipple 33 and a bearing plate 34, these parts taking the place of the sharp end 30 and flange 28 of the construction shown in Fig. 1. In the construction shown in Fig. 4, the reduced portion 32 of the float permits the bent end 24 of the pipe 6 to extend up vertically between the float and the casing to the height required.

If it be desired for any reason to extend the air pipe to the top of the casing, this may be done by making a side groove, indicated at 35 in Fig. 5, which would provide a space for the pipe to pass the float and lie between it and the casing.

The operation of the device specified is the same for all the figures and may be briefly described as follows:

Assuming there is water of condensation in the casing and the valve closed, air entering from the radiator will pass through the pipe 6 above the water and the pressure, together with the siphoning action of the pipe 8, will force the water out and clear the valve which will then drop to open the vent 13. Air will then pass through the casing out through the vent 13 until the radiator has been freed of air whereupon steam will pass through the pipe into the casing. As soon as the steam enters the thermostatic strip will be expanded by the heat and will lift the float and the vent 13 will be closed.

While the invention has been shown and described in its preferred form, it will be understood that certain changes and variations may be made in the various parts without departing from the invention, and that the invention is not to be limited to the construction shown and described.

What I claim is:

1. In an air valve, the combination of a valve casing and means for attaching it to a radiator, a valve seat and guide in the top of the casing, a closed float in the casing having a valve cooperating with the seat and guide, a projection extending downwardly from the bottom of the float, and a thermostatic strip secured in the casing below the float and having arms extending toward each other with a space between into which the projection on the float bottom extends.

2. In an air valve, the combination of a valve casing and means for attaching it to a radiator, a valve seat and guide in the top of the casing, a closed float in the casing having a valve co-operating with the seat and guide, a thermostatic strip secured in the lower part of the casing and having arms bent to extend horizontally toward each other below the float with a space between the adjacent arms into which the end of the float projects, and a flange on the float against which the arms bear.

3. In an air valve, the combination of a valve casing and means for attaching it to a radiator, a valve seat and guide in the top of the casing, a closed float in the casing having a wide top portion and a reduced lower portion, a valve on top of the float co-operating with the seat and guide, and a thermostatic strip in the casing having horizontally arranged arms extending toward each other below the float with a space between the arms into which the reduced end of the float projects.

4. In an air valve, the combination of a casing and means for attaching it to a radiator, a float in the casing having a wide upper portion and a reduced lower portion, an air pipe from the radiator extending into the casing and turned upwardly between the inner walls of the casing and the reduced portion of the float, and a thermostatic element below the float for operating it.

In testimony whereof, I have hereunto set my hand.

WILLIAM A. RUSSELL.